United States Patent
Antao et al.

(10) Patent No.: US 10,685,356 B2
(45) Date of Patent: Jun. 16, 2020

(54) SYSTEMS AND METHODS FOR PROVIDING ELECTRONIC TRANSACTION AUDITING AND ACCOUNTABILITY

(71) Applicant: The Coca-Cola Company, Atlanta, GA (US)

(72) Inventors: Leonard F. Antao, Smyrna, GA (US); Gerard E. Insolia, Atlanta, GA (US); H. Brock Kolls, Alpharetta, GA (US)

(73) Assignee: The Coca-Cola Company, Smyrna, GA (US)

( * ) Notice: Subject to any disclaimer, the term of this patent is extended or adjusted under 35 U.S.C. 154(b) by 1259 days.

(21) Appl. No.: 14/461,037

(22) Filed: Aug. 15, 2014

(65) Prior Publication Data
US 2014/0358791 A1 Dec. 4, 2014

Related U.S. Application Data

(63) Continuation of application No. 12/035,191, filed on Feb. 21, 2008, now Pat. No. 9,460,440.

(51) Int. Cl.
| | |
|---|---|
| G06Q 40/00 | (2012.01) |
| G06Q 20/40 | (2012.01) |
| G06Q 10/10 | (2012.01) |
| G06Q 30/06 | (2012.01) |
| G06Q 40/02 | (2012.01) |

(52) U.S. Cl.
CPC ......... *G06Q 20/405* (2013.01); *G06Q 10/10* (2013.01); *G06Q 30/06* (2013.01); *G06Q 40/02* (2013.01); *G06Q 40/12* (2013.12)

(58) Field of Classification Search
CPC ......... G06Q 40/00; G06Q 30/00; G06Q 99/00
USPC ................. 705/26.81, 42; 235/381
See application file for complete search history.

(56) References Cited

U.S. PATENT DOCUMENTS

| | | | | |
|---|---|---|---|---|
| 5,680,611 A * | 10/1997 | Rail | ......... | G06F 11/10 |
| 6,505,095 B1 * | 1/2003 | Kolls | ......... | G07F 5/18 |
| | | | | 700/236 |
| 6,601,037 B1 * | 7/2003 | Kolls | ......... | G06Q 10/10 |
| | | | | 705/14.51 |
| 6,629,080 B1 * | 9/2003 | Kolls | ......... | G06Q 10/10 |
| | | | | 705/26.81 |
| 6,643,623 B1 * | 11/2003 | Kolls | ......... | G06Q 10/10 |
| | | | | 705/14.51 |
| 6,684,197 B1 * | 1/2004 | Kolls | ......... | G06Q 10/10 |
| | | | | 705/41 |
| 7,076,329 B1 * | 7/2006 | Kolls | ......... | G07F 19/20 |
| | | | | 700/232 |
| 7,593,897 B1 * | 9/2009 | Kolls | ......... | G06Q 20/10 |
| | | | | 235/381 |

(Continued)

*Primary Examiner* — Oluseye Iwarere
(74) *Attorney, Agent, or Firm* — Eversheds Sutherland (US) LLP

(57) ABSTRACT

Embodiments of the invention can provide systems and methods for electronic transaction auditing and accountability. In one embodiment, a method of providing electronic transaction auditing can be implemented. The method can include determining at least one unique identifier associated with a respective transaction. The method can also include communicating the at least one unique identifier to a destination server. In addition, the method can include receiving data associated with an electronic transaction and at least one unique identifier corresponding to the unique identifier previously communicated to the destination server and associated with the respective transaction.

11 Claims, 10 Drawing Sheets

(56) References Cited

U.S. PATENT DOCUMENTS

| | | | | |
|---|---|---|---|---|
| 7,630,939 B1* | 12/2009 | Kolls | G06Q 20/042 | 705/43 |
| 8,645,273 B2* | 2/2014 | Antao | G06Q 20/108 | 235/381 |
| 2002/0052754 A1* | 5/2002 | Joyce | G06Q 20/00 | 455/407 |
| 2002/0120846 A1* | 8/2002 | Stewart | G06Q 20/04 | 713/168 |
| 2002/0156704 A1* | 10/2002 | Kolls | G06Q 30/02 | 705/26.1 |
| 2002/0174030 A1* | 11/2002 | Praisner | G06Q 20/10 | 705/39 |
| 2003/0050930 A1* | 3/2003 | Mosher, Jr. | G06F 11/2076 | |
| 2003/0200212 A1* | 10/2003 | Benson | G06F 9/466 | |
| 2004/0069845 A1* | 4/2004 | Goldstein | G06K 17/00 | 235/380 |
| 2004/0153421 A1* | 8/2004 | Robinson | G06Q 20/04 | 705/75 |
| 2005/0261995 A1* | 11/2005 | Phelan | G06Q 30/00 | 705/31 |
| 2006/0122881 A1* | 6/2006 | Walker | G06Q 10/087 | 705/14.13 |
| 2006/0243796 A1* | 11/2006 | Macklin | G06Q 10/02 | 235/382 |
| 2007/0012759 A1* | 1/2007 | Allarea | G06Q 20/10 | 235/379 |
| 2007/0095901 A1* | 5/2007 | Illingworth | G06Q 30/02 | 235/381 |
| 2007/0100696 A1* | 5/2007 | Illingworth | G06Q 30/0268 | 705/14.65 |
| 2007/0138265 A1* | 6/2007 | Powell | G06O 20/10 | 235/381 |
| 2007/0262139 A1* | 11/2007 | Fiebiger | G06Q 20/20 | 235/380 |
| 2008/0033880 A1* | 2/2008 | Fiebiger | G06Q 20/20 | 705/44 |
| 2008/0041937 A1* | 2/2008 | Vawter | G06Q 20/367 | 235/380 |
| 2009/0055281 A1* | 2/2009 | Demedio | G06Q 20/18 | 705/21 |
| 2009/0216575 A1* | 8/2009 | Antao | G06Q 20/108 | 705/42 |
| 2009/0216665 A1* | 8/2009 | Merwarth | G06Q 30/06 | 705/30 |
| 2009/0281891 A1* | 11/2009 | Walker | G06Q 30/0238 | 705/14.38 |

* cited by examiner

1000

1100

SYSTEMS AND METHODS FOR PROVIDING ELECTRONIC TRANSACTION AUDITING AND ACCOUNTABILITY

CROSS-REFERENCE TO RELATED APPLICATION

This application is a continuation of U.S. patent application Ser. No. 12/035,191, filed on Feb. 21, 2008, and entitled "Systems and Methods for Providing Electronic Transaction Auditing and Accountability," the contents of which are hereby incorporated herein by reference.

TRADEMARKS

COCA-COLA® is a registered trademark of The Coca-Cola Company, Atlanta, Ga., U.S.A. Other names used herein may be registered trademarks, trademarks or product names of The Coca-Cola Company or other companies.

TECHNICAL FIELD OF THE INVENTION

This invention relates to a vending network, and in particular to systems and methods for providing electronic transaction auditing and accountability.

BACKGROUND OF THE INVENTION

In the vending industry, coins and bills have been one manner used to pay for vended goods and services. In this regard, when a vending account is to be settled, coins and bills can be collected from vending equipment, and the coins and bills can be reconciled with the physical inventory to determine what was sold and how much money was collected.

In recent years, cashless payments, for example credit cards, have become an option for payments. In this regard, a user of vending equipment may now be able to use cashless payments, in addition to coin and bill payments, for vended goods and services. In the case of cashless payments, a cashless payment can typically be processed by a third party server. Subsequently, an electronic funds transfer (EFT) can remit the cashless payment received, less any transaction processing fees and/or other fees, to an operator of the vending equipment. Even so, in some instances, the EFT may not reconcile an actual vend event with an associated actual cashless transaction. To further complicate matters, the vend sale amount may not match the EFT amount since fees may be deducted from the cashless funds, and oftentimes, the EFT transactions may represent an aggregated batch or bundling of multiple transactions, thus obscuring each individual vend transaction.

The processing of cashless transactions can cause numerous problems for processors handling cashless transactions, vendors offering goods and/or services by way of a vending machine accepting cashless transactions, and others involved in the cashless transaction process. For example, in one settlement process, coins, bills, and cashless transactions may not be timely reconciled with inventory since many cashless transactions may still be stored in a vending machine or other associated data storage device. In other instances, cashless transactions may still be en route to a third party server, not settled yet and/or aggregated with little or no transaction level detail. Oftentimes, only after vend settlement is initiated, may an associated EFT transaction occur, which can further frustrate the settlement process because of the aggregated nature of EFTs.

In addition, the routing of cashless transactions to one or more third party servers can also create an accountability problem. In some instances, multiple items can be vended from a vending machine, and one or more customers may attempt to pay with a cashless implement, such as a credit or debit card. However, in such instances, there is no guarantee that a vending equipment operator will ever see funds for vends paid for by cashless transactions, and no further guarantee that a customer was correctly charged for the vended goods and/or services. As such, there may be little or no accountability as to when vends occurred or what was charged to the customer. Moreover, there may be little or no accountability as to whether a customer was timely and accurately charged, and little or no assurance that a vending equipment operator timely received the correct funds for vends paid for by cashless transactions.

Furthermore, a problem exists in auditing third party servers to verify accuracy and/or correctness of cashless transactions. In this regard, cashless transaction vending can lack oversight, accountability, auditing controls, and the ability to control how a device in the vending equipment operates and how data is communicated with or between various servers or other data processing devices.

Another problem occurs when route personnel attempt to reconcile transaction amounts and inventory at a vending equipment location. In some instances, the amount of bills, coins, cashless vends, and inventory must be known at the same point in time. As related to cashless transactions, this means knowing what the value of each transaction is without any fees removed, knowing which of the cashless transactions have been settled, and also knowing which of the settled cashless transactions have a corresponding EFT record indicating that an operator of the vending equipment has been paid for the cashless transactions. Without this level of detail, it may be unlikely that an accurate or timely vending equipment settlement can be performed without error across multiple vending equipment locations. For vending equipment in global locations, the settlement process may not be performed efficiently.

Therefore, a need exists for systems and methods for providing electronic transaction auditing and accountability.

SUMMARY OF THE INVENTION

Some or all of the above needs can be addressed by various embodiments of the invention. Embodiments of the invention can provide systems and methods for providing electronic transaction auditing and accountability.

In one embodiment, a method of providing electronic transaction auditing can be implemented. The method can include determining at least one unique identifier associated with a respective transaction. The method can also include communicating the at least one unique identifier to a destination server. In addition, the method can include receiving data associated with an electronic transaction and at least one unique identifier corresponding to the unique identifier previously communicated to the destination server and associated with the respective transaction.

In another embodiment, a system for providing electronic transaction auditing is provided. The system can include a server and at least one electronic transaction auditing module. The electronic transaction auditing module can be operable to generate at least one unique identifier associated with a respective transaction. In addition, the electronic transaction auditing module can be operable to communicate the unique identifier to a destination server. Furthermore, the electronic transaction auditing module can be operable to receive from the destination server, an electronic transaction and at least one unique identifier corresponding to the unique identifier previously communicated to the destination server and associated with the respective transaction. Moreover, the electronic transaction auditing module can be operable to compare the electronic transaction to data stored in a data storage device associated with the server. The electronic transaction auditing module can also be operable to audit the destination server based at least in part on the comparison.

In yet another embodiment, a method of electronic transaction accountability can be implemented. The method can include receiving an electronic transaction from a transaction-type device at a server. In addition, the method can include determining if the transaction-type device is authorized to perform the electronic transaction. Furthermore, the method can include associating at least one unique identifier with the electronic transaction. Further, the method can include verifying the electronic transaction is in accordance with at least one predefined state sequence. The method can also include communicating a data packet comprising the at least one unique identifier and data associated with the electronic transaction to a destination server.

In a further embodiment, a system for providing electronic transaction accountability can be implemented. The system can include at least one electronic transaction auditing module operable to receive an electronic transaction from a transaction-type device. In addition, the electronic transaction auditing module can be operable to generate at least one unique identifier associated with the electronic transaction. Furthermore, the electronic transaction auditing module can be operable to generate a data packet comprising the at least one unique identifier and data associated with the electronic transaction. Moreover, the electronic transaction auditing module can be operable to communicate the data packet to a destination server.

Other embodiments and aspects of the invention are described in detail herein and are considered a part of the claimed invention. For a better understanding of embodiments of the invention with features and aspects, refer to the description and to the drawings.

BRIEF DESCRIPTION OF THE FIGURES

The foregoing and other features, and aspects of the invention are apparent from the following detailed description taken in conjunction with the accompanying drawings in which.

DETAILED DESCRIPTION OF EMBODIMENTS OF THE INVENTION

As used herein, the term "transaction" can refer to a cash or cashless payment associated with a purchase of a good and/or service. Embodiments of the invention are intended to cover any combination of cash and/or cashless payments or transactions as well as payments or transactions relating to any combination of goods and/or services.

As used herein, the terms "server switch" and "server" can be used interchangeably. Embodiments of the invention are intended to cover any combination of servers, server switches, or other processing devices with similar functionality to a server or server switch.

As used herein, the terms "reconciliation token" and "unique identifier" can be used interchangeably. Embodiments of the invention are intended to cover any type of unique identifier including, but not limited to, a reconciliation token or any other device, code, or identifying instrument with similar functionality.

Figure 1:
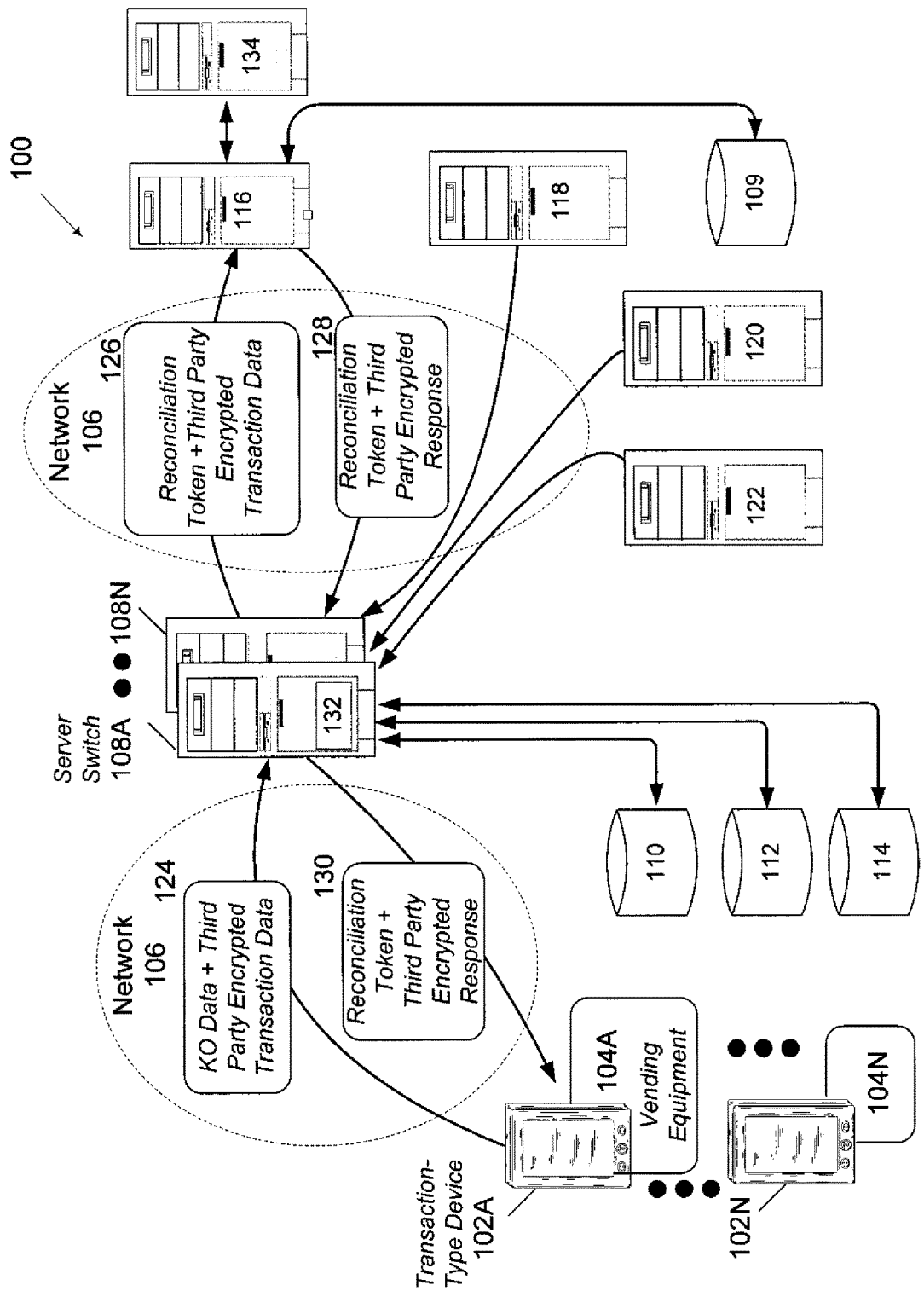
FIG. 1 illustrates an example electronic transaction auditing and accountability system in accordance with an embodiment of the invention.

Referring now to FIG. 1, an example of a system 100 in accordance with an embodiment of the invention is shown. Embodiments of the invention can provide systems and methods for electronic transaction auditing and accountability. In general, embodiments of the invention, such as system 100, can use one or more reconciliation tokens to track or otherwise mark any number of transactions handled by the system during communications between at least one server switch and one or more third party servers and/or a settlement engines. Other embodiments of the invention are described in FIGS. 2-6. Example methods associated with embodiments of the invention are described in FIGS. 7-11.

In the embodiment shown in FIG. 1, a system 100 can include one or more transaction devices 102A-N associated with respective vending equipment 104A-N. Some or all of the transaction-type devices 102A-N can be in communication via at least one network, such as 106, with one or more server switches, such as 108A-N. In one embodiment, one or more transaction-type devices 102A-N can be in communication with each other via one or more networks, such as 106.

Transaction-type devices 102A-N can be any processor-type device, and may be referred to individually as a data processing device. Some or all transaction-type devices 102A-N can be operable to receive and transmit data associated with at least one cash and/or cashless transaction, or a consumer. Such data may be referred to as transaction data. Transaction data can include, but is not limited to, vending equipment load-to-load (also referred to as fill-to-fill) information, vend transaction matching and reconciliation processing data, electronic fund transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and any other type of data associated with a vending equipment transaction or a consumer. Examples of transaction-type devices can include, but are not limited to, a cash transaction reader, a cashless transaction reader, a combination cash and cashless transaction reader, a RFID reader, a biometric reader, an energy management system (EMS)-type device, a vending machine controller (VMC), and any other type of payment transaction devices. In some instances, a transaction device can be manufactured by HP™, DELL™, IBM/LENOVO™, and GATEWAY™, and may operate software provided by MICROSOFT™, and LINUX™.

In one embodiment, a transaction-type device, such as 102A, can be a payment device operable to accept a cash and/or cashless payment from a consumer, and further operable to facilitate the dispensing of goods and/or services from associated vending equipment, such as 104A. In another embodiment, a transaction-type device, such as 102A, can be a vending equipment controller operable to facilitate the operation of associated vending equipment, such as 104A.

Vending equipment 104A-N can include, but is not limited to, a product or beverage dispenser, a vending machine, a snack dispenser, a device capable of dispensing or providing a consumable food or drink item, a device capable of dispensing or providing a non-consumable item, or a device capable of facilitating purchase of a good and/or service. Vending equipment, such as 104A, can also be referred to individually as a vending machine. In some embodiments, vending equipment 104A-N may conform to vending industry standards including, but not limited to, the National Automatic Merchandising Association (NAMA) MDB specification, and the European Vending Association (EVA) DEX specification. In one embodiment, vending equipment 104A-N can include a vending industry standard-type multi-drop-bus (MDB) interface, and/or a data exchange (DEX) interface.

In one embodiment, multi-drop-bus (MDB) data can be collected from vending equipment, such as 104A-N, and the collected MDB data used to form transaction data records. In this regard, MDB data can include, but is not limited to, inventory, product pricing, and other data during vend events that can be combined with payment ID (for example a PIN number or credit card number) to form a transaction record. In addition, MDB data can be collected during non-vend events and used to form transaction records such as service requests, energy management records, and other types of transaction records.

In the embodiment shown in FIG. 1, a network 106 can be wired or wireless-type network, and may be more than one network to facilitate both wired and wireless-type communications between system components. The network 106 shown in FIG. 1 is shown by way of example. Examples of a network 106 can include, but are not limited to, a local area network (LAN), a wide area network (WAN), the Internet, a global network, a wireless network, a wired network, and any combination thereof. Wireless network communications can be implemented, for example, by way of GSM, GPRS, CDMA2000, 1×RTT, EDGE, 802.11 types and kinds including but not limited to 'a', 'b', 'g', 'n', 900 MHz, 2.4 GHz, 5 GHz, spread spectrum, open wireless standards, proprietary wireless techniques, 3G, 3.5G, 4G technologies ('G' stands for generation), and any other wireless-type communication device, standard, or methodology. Wired network communications can be implemented, for example, by way of Ethernet, Firewire, serial communications, USB, RS232, and any other wired-type communication device, standard, or methodology. In one embodiment, a network can be the Internet, which may be referred to as a global network.

In the embodiment shown, a server switch 108A can be a processor-based platform, such as a server. In one embodiment, a server switch 108A can be operable to store a copy of some or all of transaction data received from one or more transaction devices 102A-N. The server switch 108A may store some or all of the transaction data in an associated database or data storage device, such as 110, 112, or 114. In another embodiment, a server switch, such as 108A, can be operable to generate a unique identifier, such as a reconciliation token, and associate the unique identifier or token with or otherwise add the unique identifier or token to a transaction record. In some embodiments, a server switch, such as 108A, can generate and associate a unique identifier or reconciliation token with some or all transactions which may be transmitted via a network, such as 106, by the system 100.

As shown in FIG. 1, the system 100 can also facilitate communications with one or more servers 116, 118, 122 and/or third parties 120. In the embodiment shown, some or all of the transaction-type devices 102A-N can be in communication with at least one of the following: a vend settlement server 116, a data services server 118, a financial institution 120, a third party server 122, and/or any device associated with a third party. In this embodiment, a transaction-type device, such as 102A, can transmit data via a network, such as 106, to a server switch, such as 108A. The server switch 108A can selectively transmit some or all of the received data to another transaction-type device, such as 102N; another server switch, such as 108N; a vend settlement server, such as 116; a data services server, such as 118; a financial institution, such as 120; a third party server, such as 122; or any other device associated with a third party. Data received by a vend settlement server 116, a data services server 118, a financial institution 120 and/or a third party server 122 can be stored in an associated database, such as 109, or other data storage device.

In one embodiment, a transaction-type device, such as 102A, can transmit data to a vend settlement server, such as 116, via a network, such as 106, and server switch, such as 108A. Data initially received or otherwise collected by the transaction-type device 102A can be transmitted to the server switch 108A in a format such as a data packet 124. The data can include, but is not limited to, vending equipment load-to-load (also referred to as fill-to-fill) information, vend transaction matching and reconciliation processing data, electronic fund transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and/or any other type of data associated with a vending equipment transaction or a consumer. Ultimately, some or all of the data can be transmitted by the server switch, such as 108A, to a vend settlement server, such as 116.

In one embodiment, one or more reconciliation tokens can facilitate auditing some or all of the transaction data handled by one or more vend settlement servers 116 and/or third party servers 122. For example, a server switch, such as 108A, can communicate at least one reconciliation token with each transaction to a vend settlement server 116 and/or third party server 122, and receive transaction data from the vend settlement server 116 and/or third party server 122 in response to each reconciliation token. In this example, a server switch 108A can transmit at least one reconciliation token in a data packet 126 to a vend settlement server 116 and/or third party server 122. In response to the receiving one or more reconciliation tokens, the vend settlement server 116 and/or third party server 122 can transmit a data packet 128 with response data including the one or more reconciliation tokens to the server switch 108A. Such response data can be compared to previously transmitted transaction data or other data previously stored in a database, such as 110, 112, or 114, or other data storage device associated with the server switch 108A. In one embodiment, a vend settlement server such as 116 can be referred to as a third party server and can be audited in a similar manner described above.

Furthermore, in one embodiment, a server switch, such as 108A, can be operable to switch or otherwise transfer one or more transaction records between various destination servers. For example, transaction data stored on a particular server can be transferred to another server by way of a server switch, such as 108A. Moreover, a server switch 108A can be operable to issue a data packet 130 with one or more reconciliation tokens in response to transaction data received or transmitted by the server switch 108A. In addition, a server switch 108A can be operable to maintain at least one transaction database for storing transaction data, such as a plurality of databases including a KO database 110, reconciliation database 112, and device database 114.

In one embodiment, a server switch, such as 108A, can be operable to control access to a network, such as 106, by inspecting each transaction received at the server switch 108A. For example, before passing transaction data from a transaction-type device, such as 102A, to a destination location, the server switch 108A can check a database, such as the device database 114, to ensure that the transaction-type device, for instance 102A, from which the transaction is received is allowed to use the network 106. If the transaction-type device 102A is not allowed to use the network 106, the transaction data is not forwarded to the destination location and optionally the transaction-type device 102A can be informed by the server switch 108A that access to the network 106 is denied.

In another embodiment, a server switch, such as 108A, can be operable to control the types or classes of transactions a particular transaction-type device, such as 102A, is allowed to transmit on a network, such as 106. In this regard, the server switch 108A can inspect the type or class of transaction being transmitted, compare each transaction type or class to one or more allowed types or classes of transactions stored in a database, such as device database 114, and determine if such a transaction is allowed from the particular transaction-type device 102A. For example, if a transaction-type device 102A is deployed to accept a particular class of transactions, such as hotel room key cards, the server switch 108A can prevent or otherwise limit all other transactions, such as non-hotel room key cards, from being used.

Referring to FIG. 1, an example article comprising at least one program module 132 or set of computer-readable instructions operable to effectuate electronic transaction auditing of at least one vending machine in accordance with an embodiment of the invention is shown. In one embodiment, an article or at least one program module 132 can be implemented by a server switch or server, such as 108A, or other suitable processor-based, computing, or client-type device.

In one embodiment, an article can be a program module or set of computer-readable instructions embodied in a computer-readable medium, such as software. For example, an article can be a program module such as an electronic transaction auditing program module 132 operable to be executed by at least one server switch or server, such as 108A. In this embodiment, the electronic transaction auditing program module 132 can generate at least one unique identifier associated with a respective transaction. The module 132 can also communicate the at least one unique identifier to a destination server, such as 134. In addition, the module 132 can receive from a destination server, such as 134, an electronic transaction and at least one unique identifier corresponding to the unique identifier previously communicated to the destination server 134 and associated with the respective transaction. Furthermore, the module 132 can compare the electronic transaction to data stored in a data storage device, such as 110, associated with the server, such as 108A. Moreover, the module 132 can audit the destination server, such as 134, based at least in part on the comparison.

A program module, such as an electronic transaction auditing program module 132, can be encoded in a variety of computer languages including, but not limited to, JAVA, PERL, PHP, PYTHON, C, C#, C++, VB.NET, VISUAL BASIC, scripting languages, assembler code, or any other type of programming language and or scripting language. A program module can be referred to, individually or collectively, as software, computer code, data, files, object files, or assembler code applications and can be embodied on any suitable machine readable medium. A machine readable medium can include, but is not limited to, a CDROM, DVD, a hard drive, a micro drive, flash memory, memory, a disk drive, a networked device, a data processing device, a data processing resource, and other types of computer-readable mediums. In one embodiment, various functions or code associated with a program module such as 132 could be distributed between multiple processing devices, such as server 108A and another server, or may reside in a single processing device, such as 108A.

Figure 2:
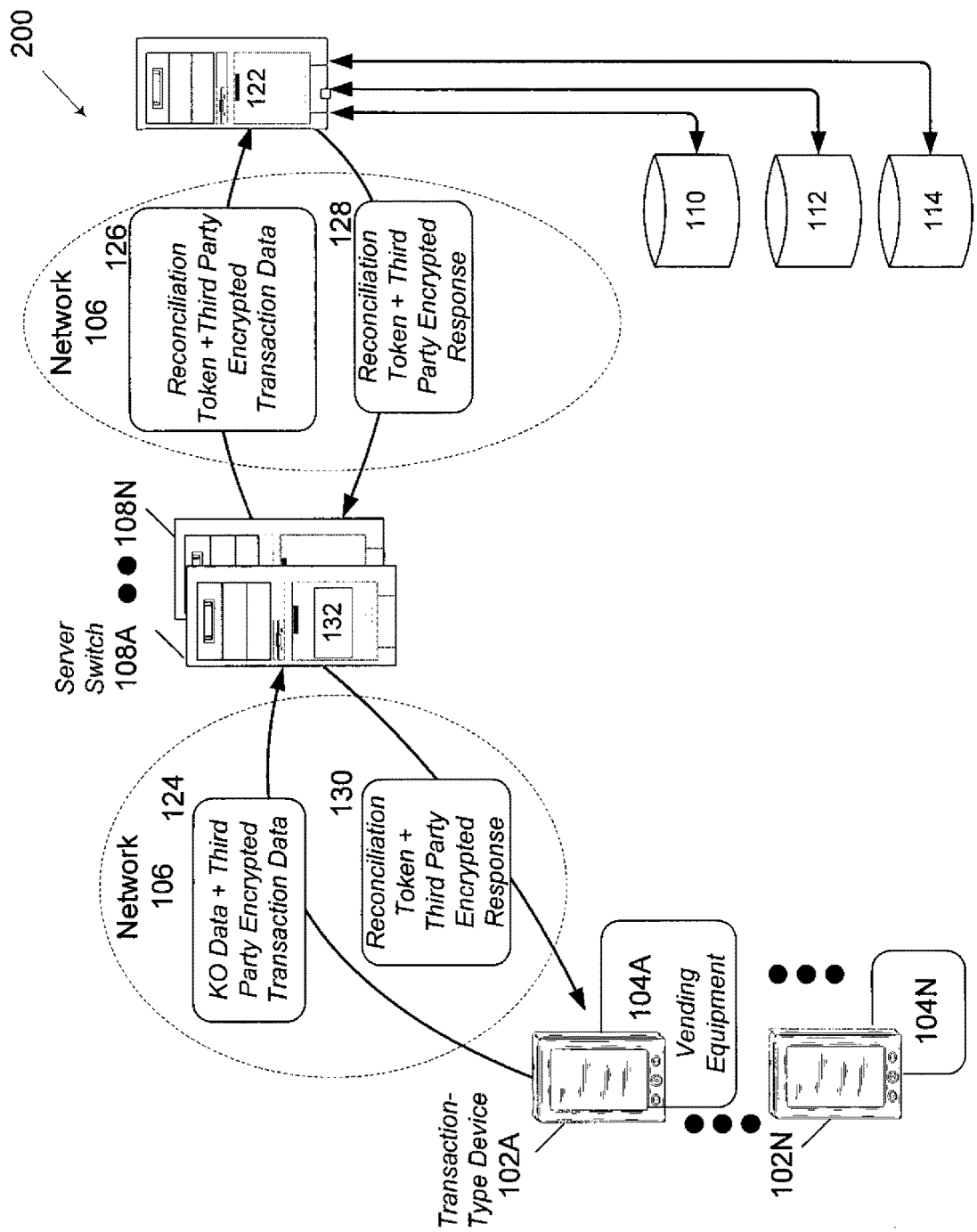
FIG. 2 illustrates an example of a system that uses a reconciliation token during communications between a server switch and a third party server and/or a settlement engine in accordance with an embodiment of the invention.

Referring to FIG. 2, an example system 200 for tracking one or more transactions in a vending network in accordance with an embodiment of the invention is shown. The system 200 can be implemented using some or all of the system components shown in FIG. 1, and in this example, some of the system components of system 100 are utilized. In this embodiment, the system 200 can include a data flow which commence when a transaction-type device, such as 102A, can initiate communication with a third party server, such as 118, by way of server switch, such as 108A. For example, the transaction-type device 102A can generate and transmit at least one data packet, such as 124, which can include transaction data that can be encrypted such that a third party server, such as 118, can decrypt the data by way of at least one decryption key. In some instances, the encrypted transaction data can include other data, such as KO data, and can be further encrypted wherein the server switch 108A can decrypt the data by way of another decryption key. In any instance, the server switch 108A can receive the encrypted data, or data packet 124, and after processing the encrypted data or data packet 124, the sever switch 108A can transmit a corresponding data packet, such as 126, to the third party server 122. After receipt and processing of the data packet 126, the third party server 118 can transmit a corresponding data packet, such as 128, to the server switch 108A, wherein the server switch 108A decrypts and processes the data. Processing of the data by a server switch, such as 108A, can include some or all of the following activities: verifying that a transaction-type device, such as 102A, is authorized to access a network, such as 106; verifying that a transaction-type device, such as 102A, is authorized to perform a particular transaction type or class; generating at least one reconciliation token; and storing data, such as KO data, in a database or data storage device, such as 110, 112, and/or 114.

Referring back to the server switch, the server switch, such as 108A, can generate at least one data packet by either generating at least one new reconciliation token if a particular transaction requires it (such as when an initial authorization request is made) or identifying and/or retrieving a previously assigned reconciliation token (such as when a third party server 122 is communicating a response to transaction-type device, such as 102A). The data packet, for example 126, can include at least one reconciliation token and previously received third party or transaction data. In some instances, the previously received third party or transaction data can be encrypted if desired. The data packet 128 can be communicated to the third party server 122.

Referring to the third party server, upon receipt of the data packet 126, the third party server, such as 122, can process the received data packet 126. Such processing can include, but is not limited to, decrypting the encrypted packet and acting on the data, or storing a reconciliation token and/or other associated transaction data in a database or data storage device, such as 110, 112, or 114.

During or after completion of processing the data packet 126 at the third party server 122, the third party server 122 can wait for a response to be communicated to transaction-type device 102A. In this regard, a data packet, such as 128, can be generated by the third party server 122 to include at least one previously received reconciliation token that was associated with the particular transaction at the server switch 108A, as well as response data from the third party server 122. In some instances, the response data from the third party server 122 can be encrypted if desired).

The third party server 122 can communicate the data packet 128 to the server switch 108A. The server switch 108A receiving the data packet 128 can use at least one reconciliation token to verify that a predefined transaction state sequence is being followed, and can update one or more state fields associated with the instant transaction. A "predefined state sequence" can be any combination of transaction states or steps in a particular sequence or order. The server switch 108A can update one or more databases as necessary, and/or otherwise process the received data packet 128. The server switch 108A can communicate a corresponding data packet 130 to the transaction-type device 102A. The data packet 130 can be received at the transaction-type device, such as 102A, where the transaction-type device 102A can process the data packet 130 and associated response data. In this example, data packets 124, 126, 128, and 130 can be of the same or similar format.

In one embodiment, a state machine data structure can be established by a server switch, such as 108A, for a particular class of transaction. In this regard, the server switch 108A can determine if a particular transaction-type device, such as 102A, is allowed to perform a particular class of transaction (for example, a hotel room key card-type-transaction) and prevent or otherwise limit the transaction-type device 102A from performing certain types of transactions (for example, RFID credit card-type transactions). Using state machine logic or a set of instructions, the server switch 108A can ensure that a prescribed sequence of communications between the transaction-type device 102A and the third party server 122 is maintained.

For example, when a transaction-type device, such as 102A, facilitates a sales or vending transaction at a vending machine, such as 104A, by way of a user paying with a credit card, a state of the transaction can be as follows. Initially, a first state can be recorded by a server switch, such as 108A, as an initial authorization request by the transaction-type device 102A. Another state can be a response to the initial authorization request by a third party server, such as 122. Yet another state can be a completed sales record communicated from the transaction-type device 102A when the user completes the sales or vending transaction. Another state can be when the third party server 122 acknowledges the receipt of the completed sales transaction record communicated from the transaction-type device 102A.

In this embodiment, the state tracking capability of a server switch, such as 108A, related to each class of transactions and for each individual transaction can permit the server switch 108A to provide accountability for some or all transactions. This can include, but is not limited to, tracking which transactions are in a particular state of processing, and instructing a transaction-type device, such as 102A, and an associated third party server, such as 122, to adhere to a predetermined sequence of communications (also referred to as "state machine type logic"). In the case where a transaction sequence is unsuitable or otherwise incorrect, a server switch, such as 108A, can stop or delay a particular transaction from proceeding and/or send a message to either or both the transaction-type device 102A and the third party server 122. This feature can permit the server switch 108A to maintain accountability of each transaction-type device 102A-N, each third party server, such as 122, and to also maintain oversight of the manner in which transaction-type devices, such as 102A-N, and an associated third party server, such as 122, communicate to perform certain classes of transactions.

One aspect of using one or more state conditions to monitor, control and/or track transactions is that at any time a server switch, such as 108A, can determine which transactions have been completed. In this regard, such information can be used, for example, to more accurately identify transactions that may appear to have been lost. Such transactions may have been authorized, but never settled, as such, the state of these missing transactions is that the transactions may only have been partially completed (no sales information, no settlement, no EFT, etc.). This aspect permits a user, via the server switch, such as 108A, to identify possible issues related to payment for products and/or services. In addition, the user can identify issues related to any number of transaction-type devices 102A-N, servers such as a third party server 122, and/or other issues related to transaction processing by the system 100.

Figure 3:
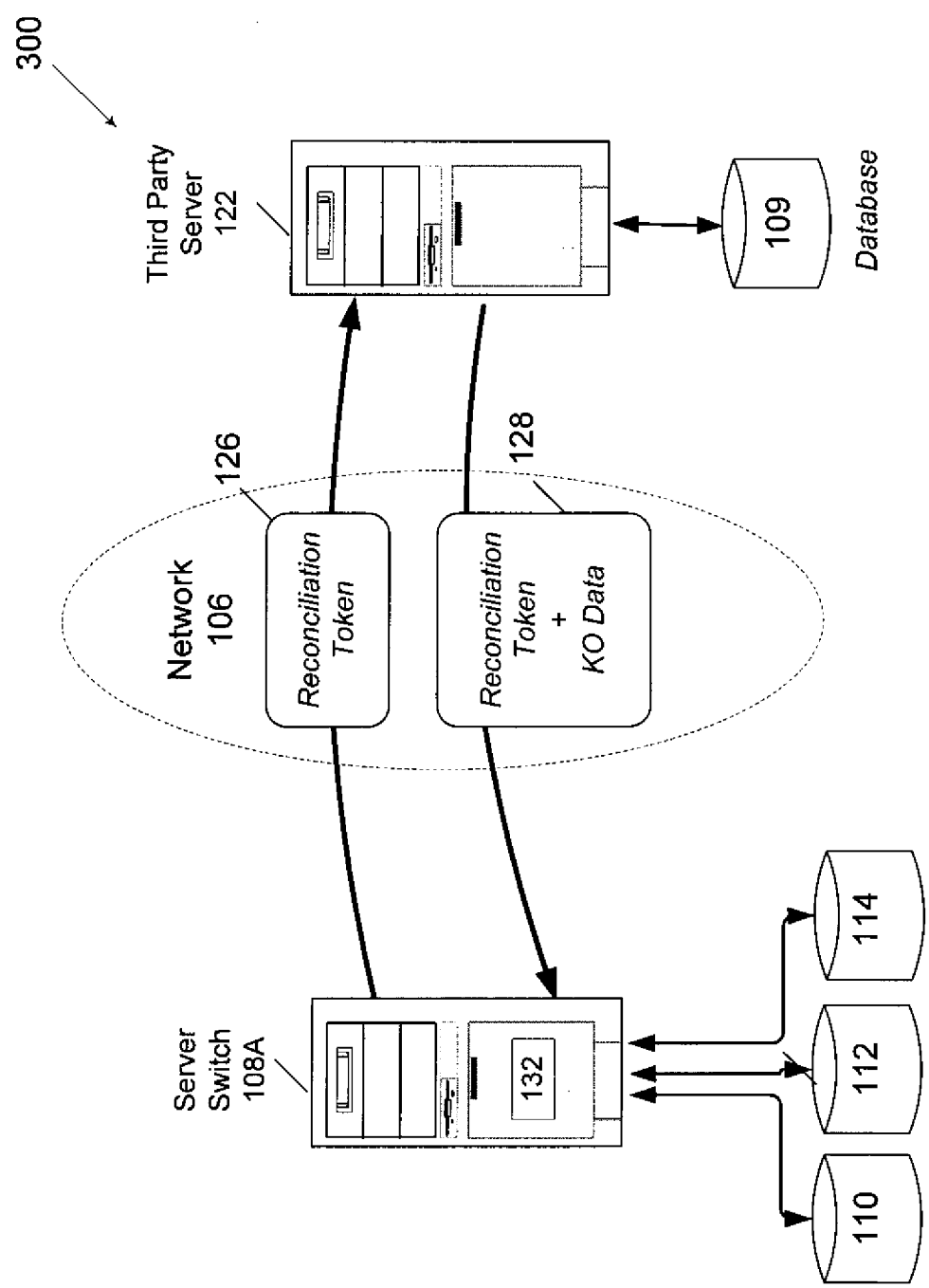
FIG. 3 illustrates an example of a system for auditing of a third party server in accordance with an embodiment of the invention.

Referring to FIG. 3, an example system 300 for auditing a third party server in accordance with an embodiment of the invention is shown. The system 300 can be implemented using some or all of the system components shown in FIG. 1, and in this example, some of the system components of system 100 are utilized. In the embodiment shown, one or more reconciliation tokens can be associated with a plurality of transactions, and some or all of the transactions and associated reconciliation tokens can be stored in one or more databases or data storage devices, such as databases 110, 112, 114. Auditing of a third party server, such as 122, can be facilitated by way of a server switch, such as 108A. In this regard, server switch 108A can communicate a data packet 126 including at least one reconciliation token or a group of data packets to one or more third party servers 122. Upon receipt of the data packet 126, the third party server 122 can respond by transmitting a data packet 128 including the at least one reconciliation token and associated response data, such as KO data, related to the transaction.

One aspect of using one or more reconciliation tokens to obtain transaction data from a third party server, such as 122, is that response transaction data can be compared to data stored in other databases or data storage devices, such as 110, 112, and/or 114 to check the validity, generate reports, and/or otherwise audit the third party server 122. This can ensure accountability of some or all transactions that may be handled by the network, and more specifically, can ensure the auditability and accountability of the transaction-type devices 102A-N and third party servers 122 which may process some or all of the transactions.

Figure 4:
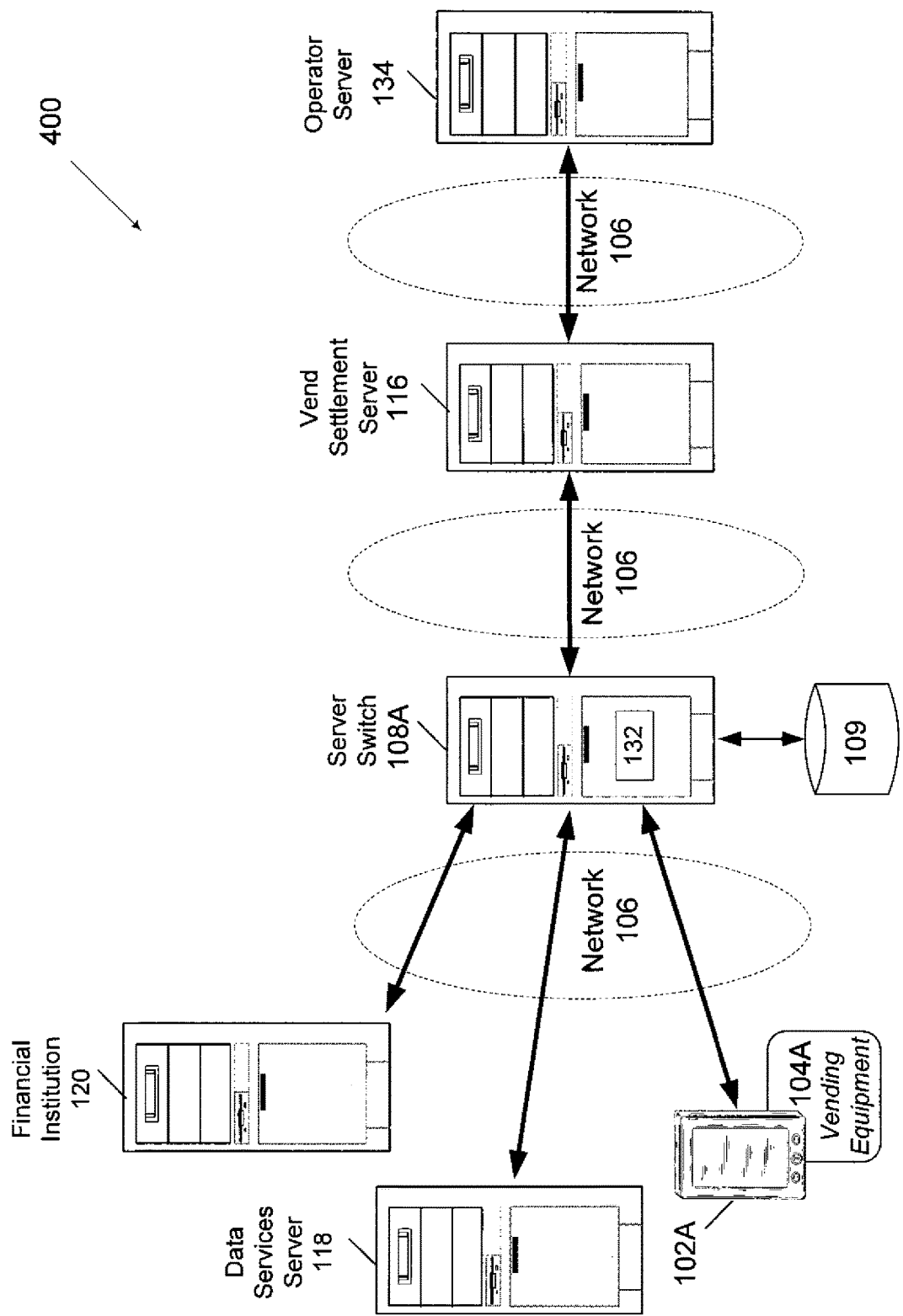
FIG. 4 illustrates an example of a system that utilizes a settlement engine to provide operational and financial data processing for an operator server in accordance with an embodiment of the invention.

Referring to FIG. 4, an example system 400 for providing a vending network in accordance with an embodiment of the invention is shown. The system 400 can be implemented using some or all of the system components shown in FIG. 1, and in this example, some of the system components of system 100 are utilized.

In the embodiment shown in FIG. 4, a vend settlement server, such as 116, can provide some or all operational and financial data processing for an associated operator server, such as 134. An operational server can be operable to manage vending equipment, such as 104A-N, and/or one or more associated vending routes. The vend settlement server 116 can be operable to coordinate the reconciliation of coins, bills, cashless transactions, and other types of inventory management data. As shown, the vend settlement server 116 can communicate with the operator server 134. With data provided by the vend settlement server 116, the operator server 134 can provide route management for vending equipment, such as 104A-N, including, but not limited to, reporting, route management, accountability, service, financial management, business analysis, asset management, product inventory management, and data processing. In this regard, a vend settlement server such as 116 can be operable for money reconciliation, pre-cashless settlement processing (determining the revenue cashless transactions should produce), post settlement processing (determining the revenue actually received from cashless transaction processing—as an example from EFTs), and coordinate the delivery of funds, inventory, and other vending equipment data to an associated operator server such as 134.

In operation, the operator server 134 can communicate with the vend settlement server 116. Initially, transaction data from one or more transaction-type devices, such as 102A, and associated vending equipment, such as 104A, can be received or otherwise collected by the server switch 108A. The server switch 108A can communicate further as needed or desired with a data services server, such as 118 and/or a third party such as a financial institution 120. As discussed previously, transaction data can be communicated by the server switch 108A to the vend settlement server 116 for processing and/or storage. Optionally, a vend settlement server, such as 116, can utilize one or more databases to store data as may be required or desired, such as a transaction database 109. In any instance, the vend settlement server 116 can communicate with the operator server 134 to handle some or all of the following activities: reconciliation of coins, bills, cashless transactions, and other types of inventory management data; reporting; route management; transaction accountability; service; financial management; business analysis; asset management; product inventory management; data processing; money reconciliation; pre-cashless settlement processing (determining the revenue cashless transactions should produce); post settlement processing (determining the revenue actually received from cashless transaction processing—as an example from EFTs); and coordinate the delivery of funds, inventory, and other vending equipment data.

In this manner, reconciliation of bills, coins, and cashless transactions can be synchronized with the product or inventory that a route operators fills the vending equipment with, or otherwise restocks the vending equipment with. Delays in processing certain types of cashless transactions, such as credit card transactions, can result in less than 100% accountability of payment detail (bills, coins, and cashless revenues) at the time the route operator is restocking the vending equipment. As such, the ability to determine what has been sold and paid for can be difficult to determine at any given time and especially when cashless transactions are delayed by processing, such as pending electronic funds transfers (EFTs). In addition, the inability to accurately determine what has been purchased from the vending equipment can cause the route personnel to incorrectly select the restock product to load on to the route truck before traveling to the vending equipment location, which may cause too much or too little restock product to be carried on the route for subsequent restocking.

Figure 5:
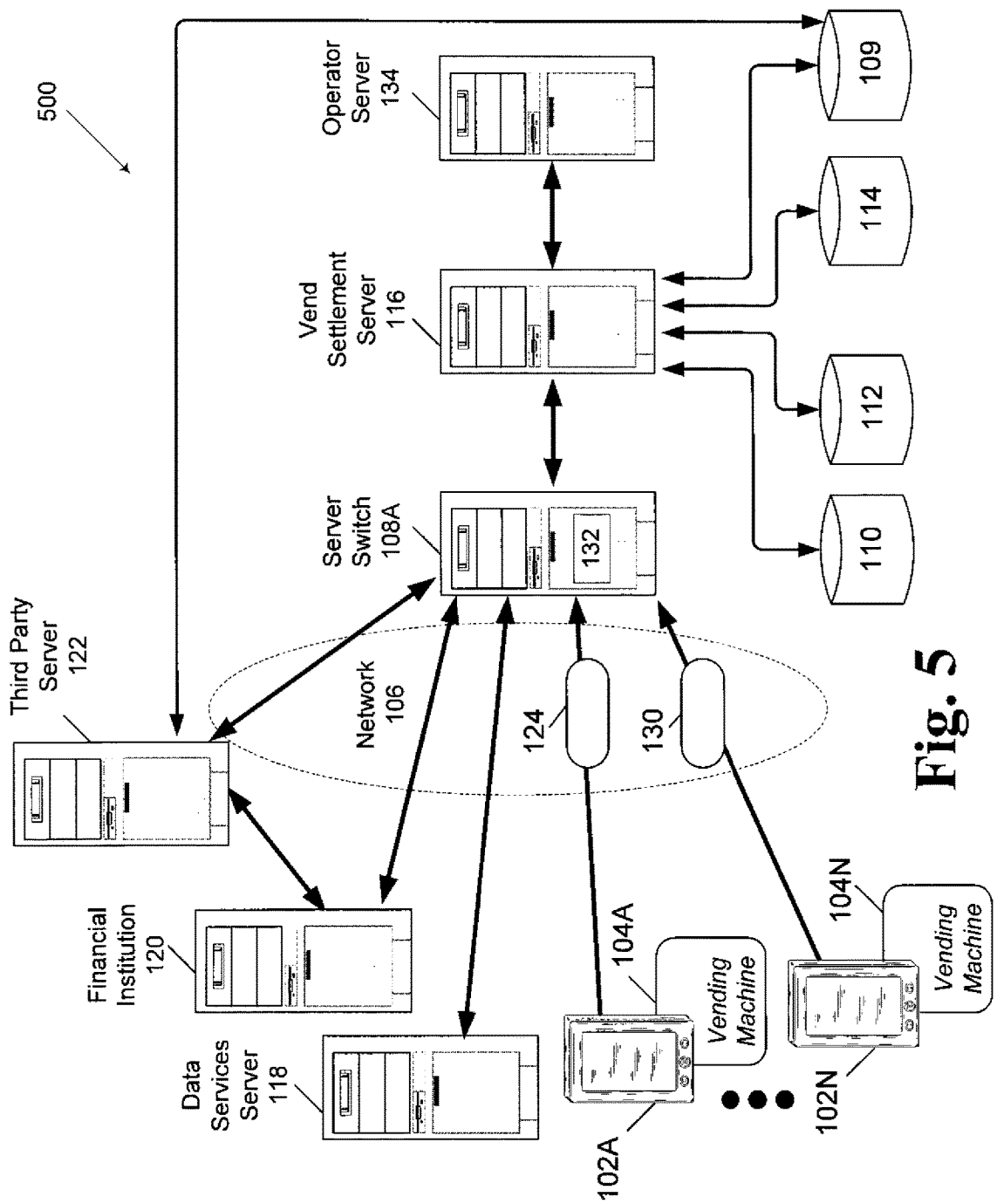
FIG. 5 illustrates an example of a system that utilizes a server switch to interface to devices, vend settlement servers, third party servers, financial institutions, and other data services in accordance with an embodiment of the invention.

In FIG. 5, an example system 500 for providing a vending network in accordance with an embodiment of the invention is shown. The system 500 can be implemented using some or all of the system components shown in FIG. 1, and in this example, some of the system components of system 100 are utilized. In the system shown, a server switch 108A can be in communication with a plurality of third party servers 122, such third party servers 122 utilizing a plurality of databases, such as transaction database 109. At least one of the third party servers 122 can be in communication with one or more financial institution servers 120, and by way of server switch 108A in communication with a plurality of transaction-type devices 102A-N. In this configuration, at least one third party server 122 can process transactions from the plurality of transaction-type devices 102A-N, and via server switch 108A can provide transaction level detail data and EFT level detail data to at least one vend settlement server 116, where such data is processed or otherwise reconciled with other data (non-cashless and other data) and then data communicated to the operator server 134.

In addition, optionally the server switch 108A can communicate with at least one financial institution server 120 and/or at least one data services server 118. In this regard, the server switch 108A can process transactions, providing as may be required and/or desired transaction level detail data, EFT level detail data, and/or other types of data or detail data to at least one vend settlement server 116, wherein the vend settlement server 116 with other data including data from at least one third party server 122 can process data and communicate as necessary with at least one operator server 134 to facilitate route management for vending equipment, such as 104A-N, including reporting, route management, accountability, service, financial management, business analysis, asset management, product inventory management, and data processing.

In the embodiment shown, a server switch, such as 108A can be in communication with one or more transaction-type devices, such as 102A-N, at least one vend settlement server 116, one or more third party servers 122, one or more financial institutions 120, and one or more data services servers 118. The transaction-type devices 102A-N can communicate different types of data, such data formatted in one or more data packets, to the server switch 108A. For example, a data packet 124 can include KO data and third party transaction data (encrypted if necessary). A second transaction-type device, such as 102B, may communicate formatted KO data illustrated as data packet 136. The flexibility of the server switch 108A to accommodate a plurality of different types of data, associated data packets, and data formats permits relevant data to be inspected and processed at the server switch 108A, such as KO data, as well as allow, if necessary, third party data (encrypted and/or otherwise proprietary) to be transmitted by the server switch 108A to a destination third party server, such as 122, and/or to a vend settlement server, such as 116.

An aspect of this embodiment is that collection of data from a plurality of transaction-type devices, such as 102A-N, at the server switch, such as 108A, can be relatively homogeneous across the plurality of devices, such as 102A-N. This can be implemented by some embodiments regardless of the type or purpose of the plurality of transaction-type devices. Another aspect of this embodiment is that oversight and accountability at the server switch, such as 108A and vend settlement server, such as 116, can be relatively easily maintained due in part to relatively homogenous data being received at the server switch 108A.

In another embodiment, an aspect is the ability for third party servers such as third party server 122 to receive data from the same transaction-type devices, such as 102A-N, in a format that allows the third party server 122 to continue operating as designed. In other words, transaction-type device, such as 102A, is operable to send a data packet (for instance, KO data and/or third party data) that can be both understood by the server switch, such as 108A, and by the third party server, such as 122. This permits both servers, the server switch 108A and the third party server 122, to function with minimal or no changes. This "shared data type function" can permit one or more third parties with their own information technology (IT) infrastructure, perhaps tailored to provide a particular product and/or service to their own customers, to use a vending network in accordance with an embodiment of the invention to both satisfy their third party data needs as well as satisfy needs of the server switch, such as 108A, a vend settlement server, such as 116, and/or an operator server, such as 134.

Another aspect of this embodiment can permit one or more third parties to provide various services to customers (web based and/or otherwise) from their own IT infrastructure while allowing a vending network in accordance with an embodiment of the invention, managed by the server switch, such as 108A, to maintain accountability, audit ability of the network, and utilize a vend settlement server, such as 116, to meet some or all of the needs of one or more vending route operators by way of an operator server, such as 134, and vending equipment personnel that may rely on the operator server 134 to operate or otherwise manage their respective businesses.

In one embodiment of a system for providing a vending network, as illustrated in FIG. 5, one or more databases, such as 109, 110, 112, and 114, or data storage devices can be associated with either or both a vend settlement server, such as 116, and/or the server switch, such as 108A.

In one embodiment of a system for providing a vending network, as illustrated in FIG. 5, a vend settlement server, such as 116, can initiate an audit of a third party server, such as 122. In this regard, a vend settlement server, such as 116, can generate and transmit one or more reconciliation tokens to a third party server, such as 122, by way of transmitting a data packet to the third party server 122, and the vend settlement server 116 can receive a data packet including a response from the third party server 122.

Another embodiment of a system for providing a vending network can include a combination of servers, wherein a server originating an audit of a third party server, such as 122, can either be a server switch, such as 108A, or a vend settlement server, such as 116, and a data packet including a response from a third party server, such as 122, can be sent to a non-originating server, such as either the server switch 108A or a vend settlement server 116.

Figure 6:
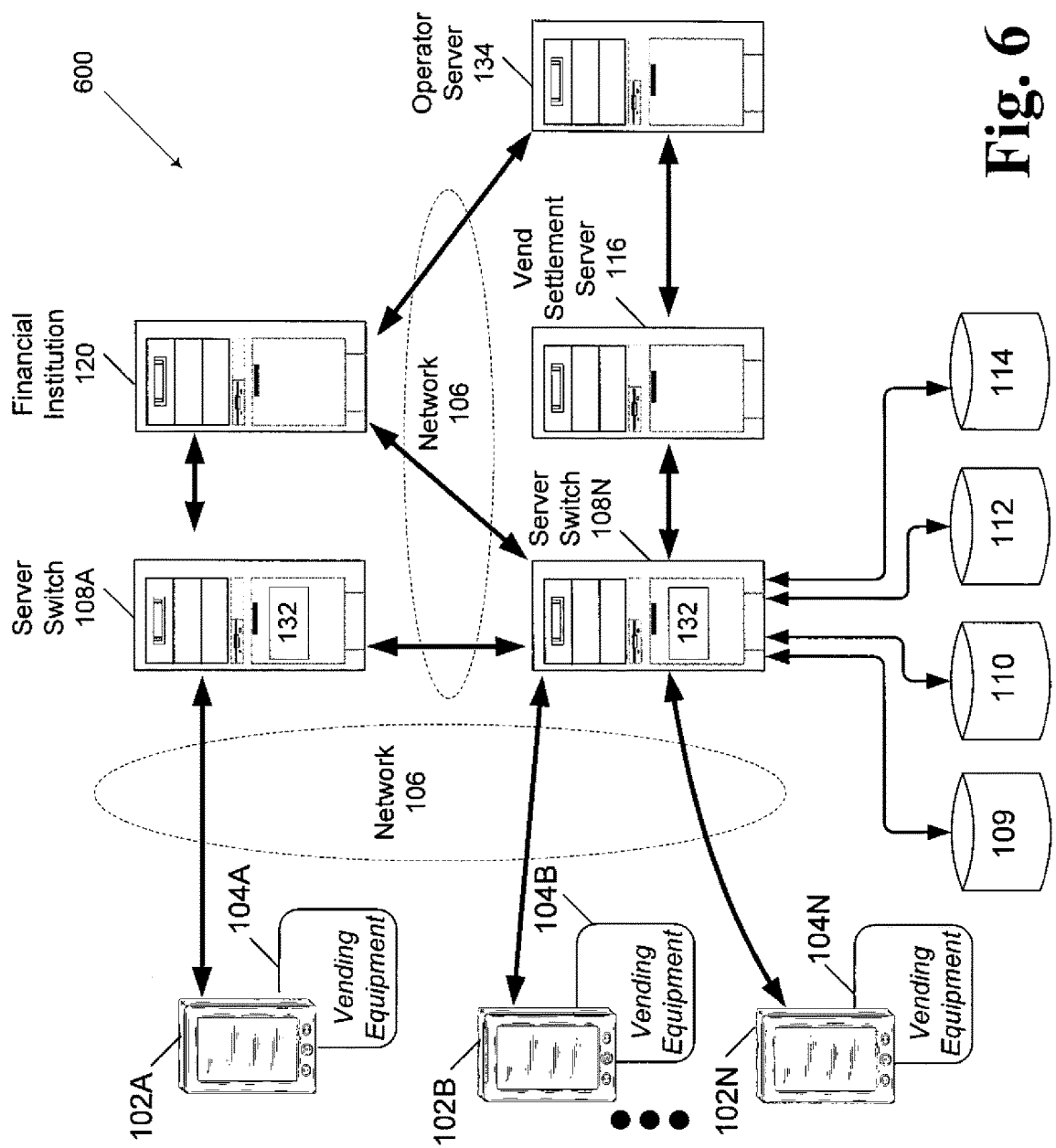
FIG. 6 illustrates an example of a system that uses a plurality of server switches to provide for relatively flexible financial transaction handling and device network connectivity via the plurality of server switches and/or the settlement engine in accordance with an embodiment of the invention.

Referring to FIG. 6, an example system 600 for providing a vending network in accordance with an embodiment of the invention is shown. The system 600 can be implemented using some or all of the system components shown in FIG. 1, and in this example, some of the system components of system 100 are utilized. In this embodiment, the system 600 can include a plurality of server switches, such as 108A-N in communication with a plurality of transaction-type devices, such as 102A-N, and at least one vend settlement server, such as 116. The plurality of transaction-type devices 102A-C can utilize one or more of the plurality of server switches 108A-N to communicate with various data processing equipment, such as financial institution 120, the vend settlement server 116, and/or other third party servers, such as 122. The system embodiment shown can provide relatively flexible financial transaction handling and device network connectivity. In this manner, different transaction-type devices and server switches can be utilized to aggregate bills, coins, cashless, inventory, and/or other types and kinds of transaction data.

The flexibility and connectivity of the system embodiment shown can permit in some instances, certain cashless transactions to be processed where a sale amount is known but the actual funds are not yet available. For example, on occasion certain cashless transaction types, such as credit cards, may appear as a "good account" when authorized, but when it comes time to settle the transaction with the actual sale amount, the settlement process may sometimes fail. Such failures can occur for various reasons including the expiration of a credit card, an account being closed sometime after authorization but before settlement, and for many other reasons. In addition, there can be typically about a 24-72 hour delay from the time the settlement process occurs and the time the funds are actually available.

These circumstances, in combination with the fact that operators of vending equipment may need to synchronize coins, bills, and cashless transactions in a timely manner (often quicker then cashless funds are available) to facilitate route and inventory management, can provide a need to track cashless transactions in a pre-settled state, a post-settled state, and/or by EFT summary detail.

Pre-settled cashless transaction can be characterized as transactions that have been completed at vending equipment, such as 104A-N, and include a sale amount and any associated vend detail but still have to be communicated to a financial institution for settlement. Post-settled cashless transactions can be characterized as cashless transactions that have been communicated to a financial institution for settlement but funds may not be available. EFT summary detail can be characterized as the actual funds available that have been deposited (wired into a bank account).

In operation, there may be times when pre-settled cashless transaction details (sales that have not been settled) need to be combined with coins, and to reconcile vending equipment as well as to manage inventory. During other situations, post-settled cashless transaction detail may need to be relied upon, and finally EFTs may be reconciled to better manage the operator business. In one embodiment, the various states and conditions related to cashless transaction handling can be accommodated by the example system shown in FIG. 6.

As shown in FIG. 6, a financial institution, such as 120, can be in communication with at least one server switch, such as 108A-N, and at least one vend settlement server, such as 116. In this manner, the system 600 can handle various cashless transactions as well as provide a plurality of communication paths such that the server switches 108A-N and the vend settlement server 116 can synchronize some or all of the cashless transactions in a variety of states. The system 600 can also handle EFTs, coins, and bills, thus facilitating route management of vending equipment, products and service inventory, and/or financial accountability at an operator server, such as 134.

Figure 7:
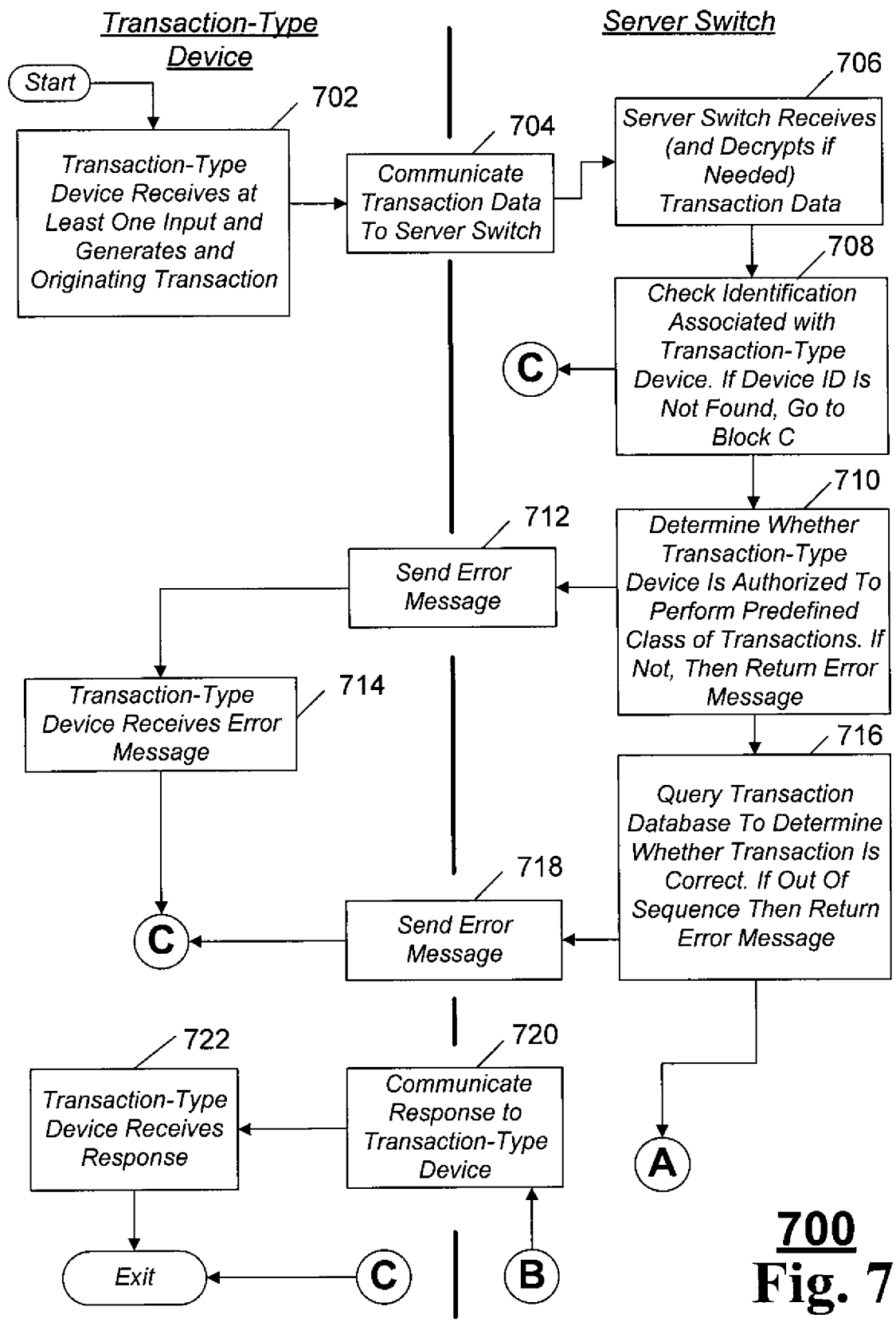
FIGS. 7 and 8 illustrate example methods using a server switch generated reconciliation token to administer transaction level accountability in accordance with an embodiment of the invention.
Figure 8:
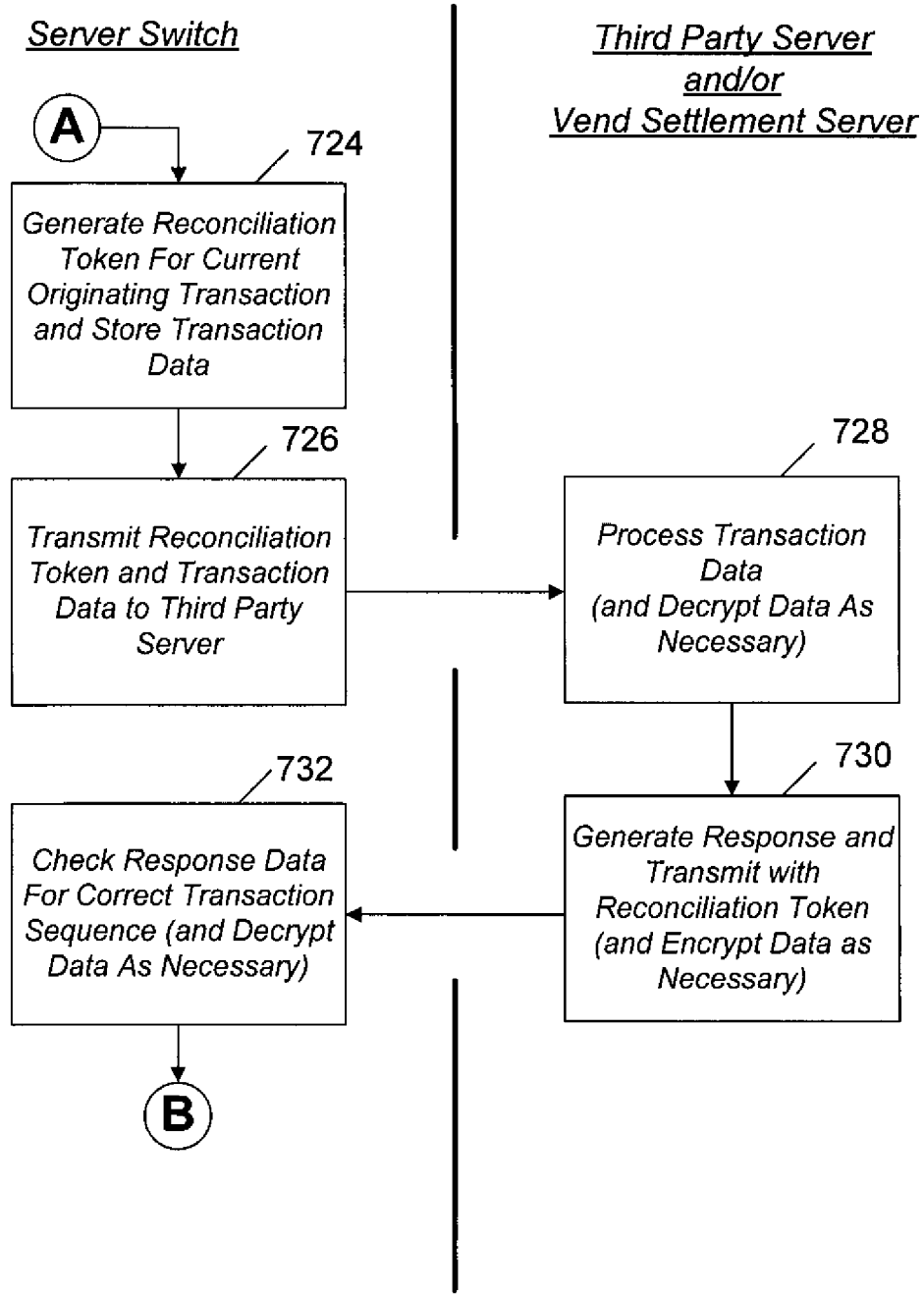

Referring to FIGS. 7 and 8, an example method of providing a vending network in accordance with an embodiment of the invention is shown. The method 700 can be performed using some or all of the system components shown in FIG. 1, and in this example, some of the system components of system 100 are utilized. In this embodiment, the method 700 can utilize at least one a server switch operable to generate one or more reconciliation tokens to administer transaction level accountability. In one embodiment, a server switch can receive transaction data and can assign one or more reconciliation tokens to the transaction data to uniquely identify and to track transactions processed or otherwise handled by a system and/or network. In this regard, when a transaction is originated, is the transaction can be assigned a unique reconciliation token by a server switch. Each successive communication referencing the same transaction can also reference the assigned reconciliation token. Embodiments of the method can permit data processing resources associated with a system and/or network to better track and monitor each transaction processed or otherwise handled by the system and/or network.

One aspect of assigning unique reconciliation tokens to each of the transactions permits a server switch and/or other data processing resources to perform transaction tracking, implement state machine logic to maintain proper transaction sequencing, audit data processing systems, and/or perform other data processing.

As described herein, an originating transaction can be any communication comprising transaction data that has not previously been assigned a reconciliation token. Such a transaction can be assigned at least one reconciliation token that can remain associated with the transaction and can be used to reference the transaction in any subsequent communications. For example, when an attempt to authorize a credit card transaction is made by a transaction-type device, such as 102A, a reconciliation token can be assigned to the transaction. When a corresponding sale is completed, the assigned reconciliation token can be part of the sale transaction record, and when settlement of the transaction is completed, the settlement transaction record can also include the same reconciliation token. At any time transaction history is called on, reviewed, or otherwise referenced, a particular transaction can be retrieved by any of various data processing resources associated with processing the transaction data by referencing the associated reconciliation token.

Referring to FIGS. 7 and 8, the method 700 can include communications between at least one transaction-type device, such as 102A, at least one server switch, such as 108A, and a third party server, such as 122, and/or a vend settlement server, such as 116. The method 700 begins at block 702.

In block 702, a transaction-type device, such as 102A, receives at least one transaction input and generates an originating transaction. In the embodiment shown in FIG. 7, transaction data associated with the originating transaction can be packaged or otherwise formatted in a data packet, such as KO data in a KO packet format with at least one unique transaction ID. In one embodiment, the transaction-type device, such as 102A, can encrypt some or all of the transaction data, KO data, KO packet format, and the unique transaction ID. The unique transaction ID data can be generated by the transaction-type device, such as 102A. A transaction input can include, but is not limited to, an instruction or command from a user to initiate a transaction, an instruction to purchase a product or service, a payment instruction, financial information, and other information associated with purchasing a product or a service.

Block 702 is followed by block 704.

In block 704, the transaction data is communicated to a server switch, such as 108A. In the embodiment shown in FIG. 7, the server switch, such as 108A, can be in communication with the transaction-type device, such as 102A, by way of at least one network, such as 106.

Block 704 is followed by block 706, in which the server switch, such as 108A, receives and, if necessary, decrypts the transaction data Block 706 is followed by block 708, in which an identification (ID) associated with the transaction-type device, such as 102A, is checked. In one embodiment, an identification (ID) associated with the transaction-type device can be referred to as a terminal ID. For example, a terminal ID can be looked up in a database accessible by a server switch, such as 108A. If the identification (ID) associated with the transaction-type device, such as 102A, is not found in the database and/or the transaction-type device is not otherwise allowed to utilize a particular network, such as 106, then communications with the transaction-type device, such as 102A, ends and the method ends at block C. If the identification (ID) associated with the transaction-type device, such as 102A, and/or the transaction-type device is allowed to utilize a particular network, then the method 700 continues at block 710.

At block 710, a determination whether the transaction-type device is authorized to perform a predefined class of transactions. In this embodiment, KO data from the KO data packet can be used to determine if the transaction-type device, such as 102A, is authorized to perform a predefined or otherwise desired class of transactions. If the transaction-type device, such as 102A, is not allowed to perform the predefined or otherwise desired class of transactions, then an error message can be generated and the method 700 continues to block 712. If the transaction-type device, such as 102A, is authorized to perform the predefined or otherwise desired class of transactions, the method 700 can continue at block 716.

In one embodiment, a plurality of transaction types can be divided or otherwise organized into one or more classes of transactions. For example, a particular class of transactions can be for RFID credit card processing, and a transaction-type device, such as 102A, may be authorized to perform or otherwise accept only this class of transactions. As such, should a transaction be submitted to an associated server switch by a transaction-type device, wherein the transaction-type device attempts to authorize a hotel room key card, a class of transactions the transaction-type device may not be authorized to perform, an error can be generated and the transaction-type device can be prevented or otherwise limited from performing such a transaction. If, however, the transaction-type device submits an RFID credit card transaction, a class of transactions that the transaction-type device may be authorized to perform, the server switch may allow this transaction to proceed.

An aspect of an embodiment of the invention is the management and oversight by the server switch of the transaction-type device. In this regard, by authorizing a transaction-type device, such as 102A, to perform only certain classes of transactions, a server switch, such as 108A, can manage at the transaction-type device level, which classes of transactions the transaction-type device, such as 102A, is allowed to and not allowed to perform.

Referring to block 712, the server switch, such as 108A, can optionally generate and transmit a message back to the transaction-type device, such as 102A. For example, a message can include a "class not authorized" message and/or other error similar messages.

Block 712 is followed by block 714, in which the transaction-type device, such as 102A, receives the message, such as a "class not authorized" or error message.

The method 700 ends at block C.

Referring to block 716, a transaction database is queried to determine whether the transaction is correct. In the embodiment shown, if the transaction already contains a reconciliation token (that is it is not an originating type of communication) then a transaction database, such as 109, is queried and the transaction located using the transaction's existing reconciliation token. The state of the transaction is checked against transaction data stored in the transaction database, such as 109, to determine if the sequence of the transaction is correct.

In one embodiment, one or more classes of transactions can have a respective prescribed sequence of transactions that are associated with each class or otherwise need to be performed as part of the class. For example, a class of credit card transactions can include an authorization request, a sales complete notification, and a settlement transaction. As such, the authorization request should take place first, the sales complete notification second, and the settlement transaction third. If a transaction is authorized and then a settlement attempt is made (without the sales complete notification step occurring) the transaction is "out of sequence", and the server switch, such as 108A, implementing state machine type logic or another set of instructions can detect the out of sequence transaction and prevent or otherwise limit the out of sequence step from occurring instead issuing an "out of sequence error".

Referring back to block 716, if the server switch, such as 108A, determines that the transaction is out of sequence then the method 700 continues at block 718. If the determination is that the transaction is in sequence or the transaction has not been assigned a reconciliation token (the transaction is an originating transaction) then the method 700 continues at block 724 in FIG. 8.

Referring to block 718, an error message can optionally be sent to the transaction-type device, such as 102A. In one embodiment, an error message can be an "out of sequence" message and/or other type of error message. The method 700 ends at block C.

Referring to block 724 in FIG. 8, a reconciliation token can be generated for the current originating transaction and the transaction data can be stored in a transaction database. In this embodiment, the server switch, such as 108A, can generate and associate a reconciliation token with the transaction data, such as KO data. The transaction data and associated reconciliation token can be stored by the server switch, such as 108A, in an associated database or data storage device, such as transaction database 109.

Block 724 is followed by block 726, in which the reconciliation token and transaction data can be transmitted to a third party server, such as 122, or to a vend settlement server, such as 116. In this embodiment, the server switch, such as 108A, can transmit the reconciliation token and transaction data, such as KO data, in a data package or data packet, and transmit the data package or data packet to the appropriate third party server, such as 122, or a vend settlement server, such as 116.

An aspect of an embodiment of the invention for having a server switch, such as 108A, generate unique reconciliation tokens is that duplicate transactions can be avoided. In this manner, one component of the system can generate and issue reconciliation tokens instead of relying on transaction IDs generated by a transaction-type device, such as 102A, and/or other servers. A drawback of conventional vending systems and networks is that third party servers and/or transaction-type devices can vary by type and manufacture, and in how transaction IDs may be generated, and as such, may not be relied upon from an accountability and/or auditing standpoint. By providing a server switch, such as 108A, operable to assign and associate one or more reconciliation tokens to transaction data as well as manage transaction level state machine type logic for each class of transactions can ensure that transactions can be uniquely identified, audited, and prescribed to a predefined or otherwise desired transaction sequencing.

Block 726 is followed by block 728, in which the transaction data is decrypted if necessary, and processed by a third party server, such as 122, or by a vend settlement server, such as 116. In this embodiment, a third party server, such as 122, or a vend settlement server, such as 116, can receive the transaction data from the server switch, such as 108A. The transaction data can be decrypted if necessary, and the transaction data, such as the KO data and associated reconciliation token can be processed by the third party server, such as 122, or a vend settlement server, such as 116. Such processing can include, but is not limited to, associating the reconciliation token with the transaction if necessary.

Block 728 is followed by block 730, in which a response is generated and transmitted with the reconciliation token by the third party server, such as 122, or by a vend settlement server, such as 116. In this embodiment, the third party server, such as 122, or vend settlement server, such as 116, can encrypt as necessary a response, such as response data, in a response data packet including the corresponding reconciliation token. The response data packet can be transmitted to the server switch, such as 108A.

Block 730 is followed by block 732, in which the response data packet can be decrypted if necessary by the server switch, such as 108A, and the response data checked for a correct transaction sequence. In this embodiment, the server switch, such as 108A, can determine the state of the transaction associated with the reconciliation token and compare the state of the transaction with previously stored data in an associated database or data storage device, such as a transaction database 109.

Block 732 is followed by block 720 in FIG. 7, in which a response from the third party server, such as 122, or a vend settlement server, such as 116, is communicated from the receiving server switch, such as 108A, to the transaction-type device, such as 102A, which initiated the originating transaction. In this embodiment, response data is transmitted from the third party server, such as 122, or a vend settlement server, such as 116, via the receiving server switch, such as 108A, to the transaction-type device, such as 102A.

Block 720 is followed by block 722, in which the transaction-type device, such as 102A, receives the response. In this embodiment, the transaction-type device, such as 102A, which initiated the originating transaction can receive the response and associated response data, and the transaction-type device, such as 102A, can process the response and response data as needed. The method 700 ends after block 722.

Figure 9:
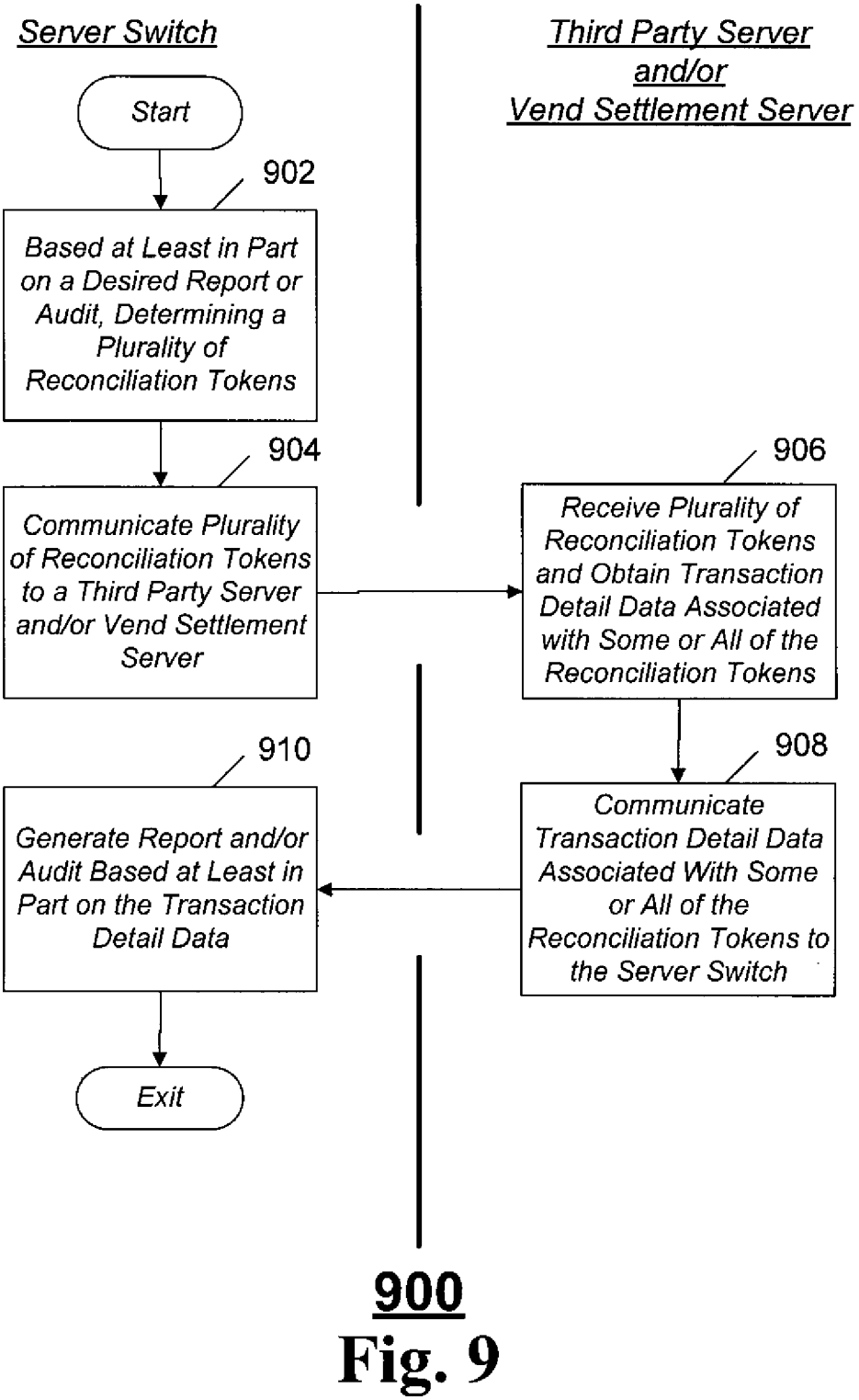
FIG. 9 illustrates an example method of using one or more reconciliation tokens to generate reports and/or audit server switch, third party servers, and/or vend settlement servers in accordance with an embodiment of the invention.

Referring to FIG. 9, an example method of using at least one reconciliation token to generate a report in accordance with an embodiment of the invention is shown. The method 900 can be performed using some or all of the system components shown in FIG. 1, and in this example, some of the system components of system 100 are utilized. In this embodiment, the method 900 can utilize at least one server switch, such as 108A, in communication with one or more third party servers, such as 122 and/or vend settlement servers, such as 116. In one embodiment, a server switch, such as 108A, can be operable to generate reports, audit a server by determining a plurality of reconciliation tokens, communicating the plurality of reconciliation tokens to one or more servers of interest, and receiving transaction detail data wherein the transaction detail data corresponds to transactions associated with the plurality of reconciliation tokens communicated to the one or more servers. For example, if a report or audit is desired to be generated for some or all transactions transacted on Jan. 22, 2007, a query by a server switch, such as 108A, of one or more third party servers, such as 122, can be performed to determine a plurality of reconciliation tokens associated with some or all transactions transacted on Jan. 22, 2007.

In one embodiment, a server switch, such as 108A, can process communications between a plurality of transaction-type devices, such as 102A-N, and one or more third party servers, such as 122. During the processing of communications, the server switch, such as 108A, can assign a unique reconciliation token to each transaction, manage various transaction states associated with each transaction, and store transaction detail data in an associated database or data storage device, such as transaction database 109.

To generate a report or to audit a third party server, such as 122, a plurality of reconciliation tokens queried by a server switch, such as 108A, can be communicated to a third party server, such as 122. In response to receiving the plurality of reconciliation tokens, the third party server, such as 122, can respond by communicating to the server switch, such as 108A, transaction detail data associated with each of the plurality of reconciliation tokens. The server switch, such as 108A, can compare the transaction detail data provided by the third party server, such as 122, to the transaction detail data or other data accessible to the server switch, such as 108A, by way of an associated database or data storage device, such as transaction database, such as 109, to check for correctness, identify any anomalies, perform data processing, and/or generate a report or audit of the third party server, such as 122.

In at least one embodiment, reports or audits can be generated by a plurality of server switches, such as 108A-N. In such embodiments, the plurality of server switches can be in communication with one or more third party servers, such as 122, vend settlement servers, such as 116, and/or on other data processing resources.

Referring to FIG. 9, the method 900 can include communications between a server switch, such as 108A, and one or more third party servers, such as 122, and/or vend settlement servers, such as 116.

The method 900 begins at block 902, in which based in part on a desired report and/or audit, a plurality of reconciliation tokens can be determined by a server switch, such as 108A. In this embodiment, a server switch, such as 108A, can generate one or more reconciliation tokens for each transaction a report and/or audit is desired for.

Block 902 is followed by block 904, in which the plurality of reconciliation tokens can be communicated from the server switch, such as 108A, to a third party server, such as 122, and/or vend settlement server, such as 116. In this embodiment, the server switch, such as 108A, can transmit the plurality of reconciliation tokens to at least one third party server, such as 122, and/or vend settlement server, such as 116.

Block 904 is followed by block 906, in which the third party server, such as 122, and/or vend settlement server, such as 116, can receive the plurality of reconciliation tokens, and can obtain transaction detail data associated with some or all of the plurality of reconciliation tokens. In this embodiment, a third party server such as 122, and/or vend settlement server, such as 116, can query a database or other data storage device, such as a transaction database 109, using some or all of the plurality of reconciliation tokens to obtain corresponding transaction detail data associated with some or all of the plurality of reconciliation tokens.

Block 906 is followed by block 908, in which the transaction detail data associated with some or all of the plurality of reconciliation tokens can be communicated to the server switch, such as 108A. In this embodiment, the third party server such as 122, and/or vend settlement server, such as 116, can transmit corresponding transaction detail data associated with some or all of the plurality of reconciliation tokens to the server switch, such as 108A.

Block 908 is followed by block 910, in which a report and/or audit is generated based at least in part on the transaction detail data received from the third party server, such as 122, and/or vend settlement server, such as 116. In this embodiment, the server switch 108A, can generate at least one report and/or audit based at least in part on the transaction detail data received from the third party server, such as 122, and/or vend settlement server, such as 116. In one embodiment, a report and/or audit can include a predefined format in accordance with generally accepted procedures, standards, or techniques. After block 910, the method 900 ends.

Figure 10:
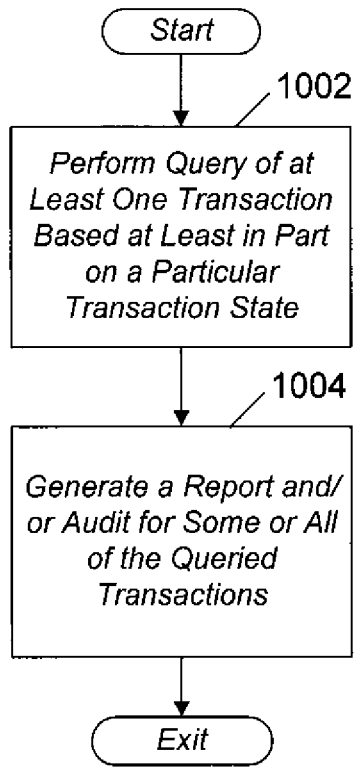
FIG. 10 illustrates an example method of using one or more transaction states to generate reports and/or audit server switch, third party servers, and/or vend settlement servers in accordance with an embodiment of the invention.

Referring to FIG. 10, an example method of using transaction states to generate a report and/or audit in accordance with an embodiment of the invention is shown. The method 1000 can be performed using some or all of the system components shown in FIG. 1, and in this example, some of the system components of system 100 are utilized. In this embodiment, the method 1000 can utilize at least one server switch, such as 108A, one or more third party servers, such as 122, and/or one or more vend settlement servers, such as 116. In one embodiment, at least one server switch, such as 108A, can manage communications between a plurality of transaction-type devices, such as 102A-N, and a plurality of servers, such as 116 and/or 122. The server switch, such as 108A, can prescribe that some or all classes of transactions have multiple steps, and can manage one or more transactions to adhere to state machine logic or another set of instructions. For example, a credit card class of transactions can include, but may not be limited to, an authorization request from a transaction-type device, such as 102A, to a third party server, such as 122; an approval response from the third party server, such as 122, back to the transaction-type device, such as 102A; a sale complete notification from the transaction-type device, such as 102A, to the third party server, such as 122; a sale complete acknowledgement from the third party server, such as 122 to the transaction-type device, such as 102A; a settlement record (pre-settlement) from the third party server, such as 122, to a vend settlement server, such as 116; and an EFT notification (post-settlement) from the third party server, such as 122, to the vend settlement server, such as 116.

Some or all of these communications can be handled and processed through a server switch, such as 108A. In addition, the server switch, such as 108A, can assign at least one unique reconciliation token to each respective transaction. The reconciliation tokens can be coupled with a state field to track each transaction and enforce a predefined sequence of transaction steps that each class of transaction can follow. One aspect of an embodiment of the invention is that a server switch, such as 108A, can enforce a predefined sequence of transaction steps to follow for each class of transactions (for example, transaction steps for a class of credit card transactions), and at any time, the server switch, such as 108A, can use some or all of the states associated with each transaction to report or audit transactions at various points in the transaction, from the originating transaction to the completion of the transaction.

For example, in the credit card processing transaction example above, a report or audit can determine which transactions were authorized but no sale complete notification information has been communicated. In another example, a report or audit can determine which transactions were in at least a sale complete state but no EFT confirmation transaction has yet been received. These types of reports and audits can be used to ensure some or all transactions can be accounted for and are otherwise not missing or incomplete.

Referring to FIG. 10, the method 1000 can include communications between a server switch, such as 108A, and one or more third party servers, such as 122, and/or vend settlement servers, such as 116. The method 1000 begins in block 1002.

In block 1002, a query of at least one transaction is performed based at least in part on a particular state. In this embodiment, a server switch, such as 108A, can query a database or data storage device, such as a transaction database 109, for at least one transaction based at least in part on an associated transaction state. For example, an associated transaction state can be where all transactions are sale complete. In another example, an associated transaction state can be a particular criteria associated with one or more transaction states, such as at least sale complete state but no EFT notification.

Block 1002 is followed by block 1004, in which a report and/or audit can be generated for some or all of the queried transactions. In this embodiment, the server switch, such as 108A, can produce or otherwise generate a report on some or all transactions queried in the database or data storage device, such as transaction database 109. In another embodiment, the server switch, such as 108A, can perform an audit and associated report for some or all of the transactions queried in the database or data storage device, such as transaction database 109. The method 1000 ends after block 1004.

Figure 11:
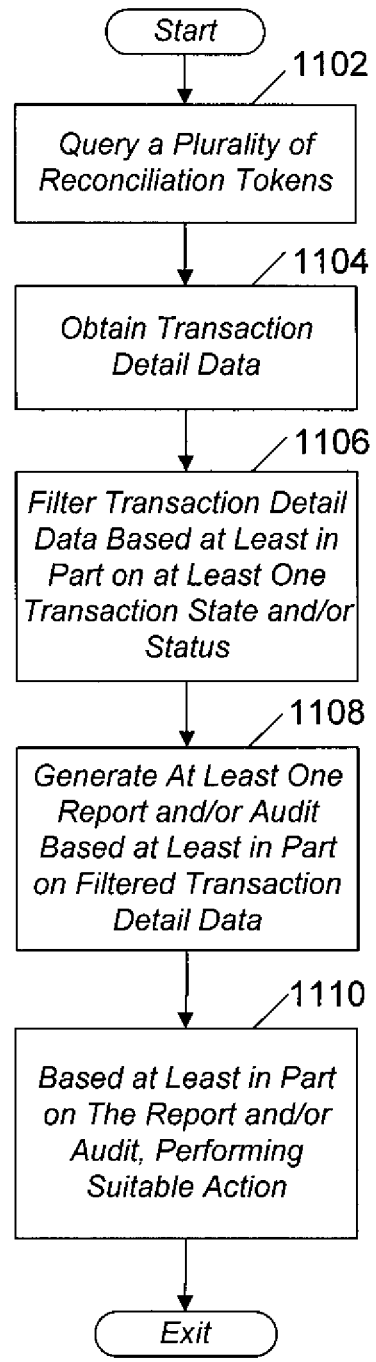
FIG. 11 illustrates an example method of using one or more reconciliation tokens and transaction states to generate reports and/or audit server switch, third party servers, and/or vend settlement servers in accordance with an embodiment of the invention.

Referring to FIG. 11, an example method of using reconciliation tokens and transaction states to generate a report and/or audit in accordance with an embodiment of the invention is shown. The method 1100 can be performed using some or all of the system components shown in FIG. 1, and in this example, some of the system components of system 100 are utilized. In this embodiment, the method 1100 can utilize at least one server switch, such as 108A, one or more third party servers, such as 122, and/or one or more vend settlement servers, such as 116. In one embodiment, a database or other data storage device, such as transaction database 109, can be accessible to a server switch, such as 108A, and can be populated with one or more transactions processed or otherwise handled by a server switch, such as 108A, one or more transaction-type devices, such as 102A-N, third party servers, such as 122, and/or vend settlement servers, such as 116.

As such, an aspect of an embodiment of the invention is to query a plurality of reconciliation tokens associated with a particular transaction state and/or other report or audit criteria, and communicate the plurality of reconciliation tokens to one or more third party servers and/or vend settlement servers. In this regard, some or all of the receiving servers can query some or all of the transaction detail data associated with each of the plurality of reconciliation tokens, and respond by sending transaction detail data to a requesting server switch, such as 108A. The server switch, such as 108A, can compare the transaction detail data to data previously stored in an associated database or data storage device, such as a transaction database 109, accessible to the server switch, such as 108A, wherein one or more reports and/or audits can be generated. Such reports and audits can be performed to ensure that one or more third party servers, such as 122, and vend settlement servers, such as 116, are accurate and otherwise ensure accountability of the transaction data being processed or otherwise handled by the system and/or network in accordance with an embodiment of the invention.

In one embodiment, a method of using reconciliation tokens to generate a report and/or audit across a plurality of servers can be implemented. In this example embodiment, some or all of the plurality of servers can encompass at least one geography, brand/or company product, and/or at least one marketing, sales, and/or business reason.

Referring to FIG. 11, the method 1100 begins in block 1102.

In block 1102, a plurality of reconciliation tokens is queried. In this embodiment, a plurality of reconciliation tokens can be queried by at least on server switch, such as 108A. Results of the query can be used to generate at least one report and/or audit.

Block 1102 is followed by block 1104, in which transaction detail data is obtained. In this embodiment, the server switch, such as 108A, can obtain transaction detail data from one or more third party servers, such as 122, and/or vend settlement servers, such as 116. For example, the server switch, such as 108A, communicating a plurality of reconciliation tokens to one or more third party servers, such as 122, and/or vend settlement servers, such as 116, and obtain transaction detail data in response to some or all of the plurality of reconciliation tokens.

Block 1104 is followed by block 1106, in which the transaction detail data is filtered based at least in part on at least one transaction state and/or status. In this embodiment, the server switch, such as 108A, can filter transaction data details received in response. A suitable filter can be based at least in part on particular transaction detail data, at least one transaction state, at least one transaction status, other data, or any combination thereof.

Block 1106 is followed by block 1108, in which at least one report and/or audit is generated based at least in part on the filtered transaction detail data. In this embodiment, the server switch, such as 108A, can generate at least one report and/or audit based at least in part on filtered transaction detail data.

Block 1108 is followed by block 1110, in which based at least in part on the report and/or audit suitable actions can be taken. In one embodiment, for example, should an audit reveal or otherwise yield an anomaly in the transaction, the anomaly can be addressed by further action, data processing, and/or other actions as needed or desired. The method 1100 ends after block 1110.

The capabilities of various embodiments of the invention can be implemented in software, firmware, hardware or some combination thereof.

As one example, one or more aspects of embodiments of the invention can be implemented in an article of manufacture (e.g., one or more computer program products) having, for instance, computer usable media. The media has embodied therein, for instance, computer readable program code as a means for providing and facilitating the capabilities of embodiments of the invention. The article of manufacture can be included as a part of a computer system or sold separately.

Additionally, at least one program storage device readable by a machine, tangibly embodying at least one program of instructions executable by the machine to perform the capabilities of an embodiment of the invention can be provided.

The flow diagrams depicted herein are just examples. There may be many variations to these diagrams or the elements (or operations) described therein without departing from the scope of the invention. For instance, the elements may be performed in a differing order, or elements may be added, deleted or modified. All of these variations are considered a part of the claimed invention.

While various embodiments of the invention have been described, it will be understood that those skilled in the art, both now and in the future, may make various improvements and enhancements which fall within the scope of the claims which follow. These claims should be construed to maintain suitable protection for embodiments of the invention described herein.

The claimed invention is:

1. A system for electronic transaction accountability, the system comprising:
   a server; and
   at least one program module to:
      receive transaction data from a transaction-type device that is in communication with a product dispenser;
      determine that the transaction-type device has a valid identification;
      determine, by the server, a class of transaction of the transaction data;
      determine, by the server, the transaction-type device is authorized to perform the class of transaction;
      validate, by the server, an electronic transaction associated with the transaction data;
      receive at least one unique identifier with the electronic transaction from the transaction-type device, wherein the at least one unique identifier is coupled with the class of transaction associated with the electronic transaction;
      generate, by the server, a reconciliation token comprising the at least one unique identifier for the electronic transaction;
      communicate the reconciliation token and the class of transaction to a destination server;
      receive, from the destination server, the reconciliation token and data indicative of a response conveying the class of transaction associated with the electronic transaction and the reconciliation token;
      compare the class of transaction to predefined set of class of transactions, wherein the electronic transaction is confirmed when the class of transaction is within the predefined set of class of transactions; and
      cause a dispensing operation via a dispensing mechanism at the product dispenser after the electronic transaction is validated.

2. The system of claim 1, wherein the server is operable to execute the at least one program module to query a transaction database to determine that the electronic transaction is correct.

3. The system of claim 2, wherein the server is operable to execute the at least one program module to compare the electronic transaction to a predefined combination of transaction processing states in a specific order, and wherein the electronic transaction is correct when a sequence of transaction processing states of the electronic transaction matches the predefined sequence of transaction processing states according to the specific order.

4. The system of claim 1, wherein the destination server is operable to execute at least one second program module to associate the reconciliation token with the transaction data at the destination server.

5. The system of claim 4, wherein the destination server is further operable to execute the at least one second program module to generate response data comprising a response data packet comprising the reconciliation token, and
   to communicate the response data to the server.

6. The system of claim 5, wherein the server is further operable to execute the at least one program module to validate the response data against a predefined combination of transaction processing states in a specific order.

7. The system of claim 6, wherein the server is further operable to execute the at least one program module to communicate the response data to the transaction type device.

8. The system of claim 1, wherein the server is further operable to execute the at least one program module to determine a plurality of reconciliation tokens based at least in part on an audit.

9. The system of claim 1, wherein the server is further operable to execute the at least one program module to communicate the plurality of reconciliation tokens to the destination server, and
   to receive, from the destination server, transaction detail data associated with at least one of the plurality of reconciliation tokens.

10. The system of claim 9, wherein the server is further operable to execute the at least one program module to generate a report for the audit based at least in part on the received transaction detail data.

11. The system of claim 1, wherein the predefined class of transactions comprises radio-frequency identification (RFID) credit card transactions.

* * * * *